Oct. 22, 1946.  C. D. SCHERMULY ET AL  2,409,904
ROCKET
Filed June 13, 1944
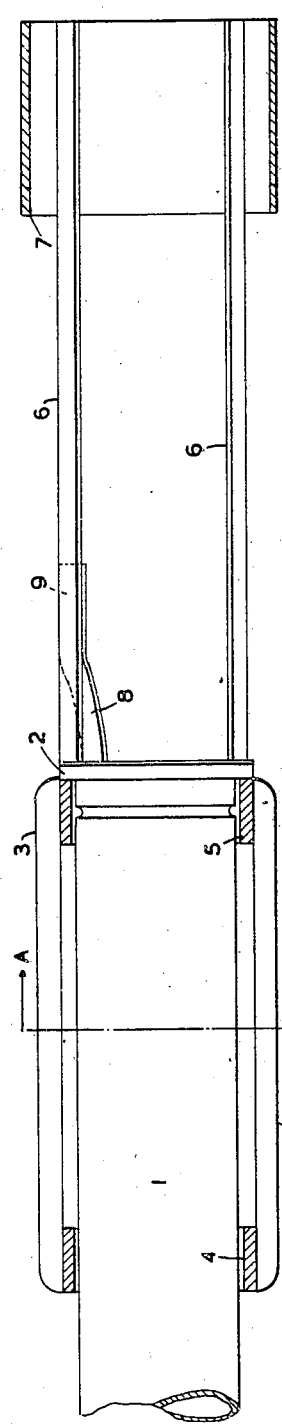
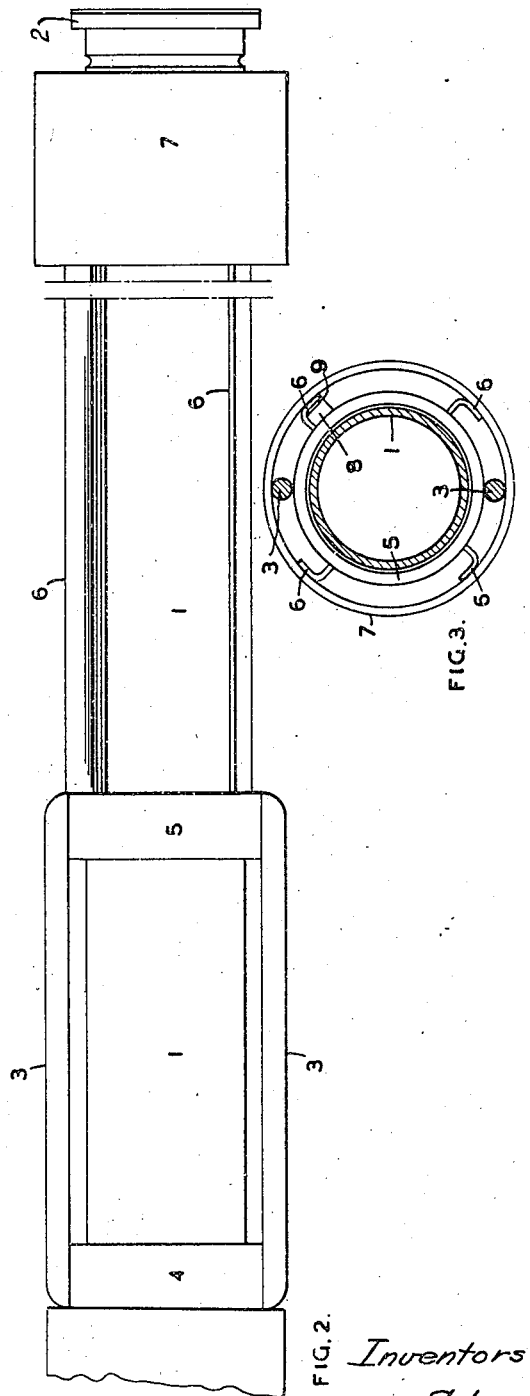
Inventors
Conrad David Schermuly
Alfred James Schermuly
Charles Schermuly
by their attorneys Howson and Howson Patented Oct. 22, 1946

2,409,904

UNITED STATES PATENT OFFICE 2,409,904

ROCKET

Conrad David Schermuly, Alfred James Schermuly, and Charles Schermuly, Parkgate, Newdigate, England, assignors to The Schermuly Pistol Rocket Apparatus Limited, Parkgate, Newdigate, Surrey, England, a British company Application June 13, 1944, Serial No. 540,093
In Great Britain May 11, 1943

1 Claim. (Cl. 102—50)

This invention relates to rockets, more particularly to the construction of the tail thereof, and has for its principal object to provide improved means for securing the tail in such manner that it is more compact and efficient in operation.

Hitherto it has been usual to provide a pair of rods secured to the rocket casing, the said rods projecting rearwardly of the rocket and having secured to their rear ends bands to which are welded or otherwise secured a number of fins which stabilise the rocket when in flight. Although this arrangement has proved extremely satisfactory, it has been found that for some purposes the overall length of the rocket and tail is too great, and it is to overcome this drawback that the rocket according to the present invention has been devised.

According to this invention a rocket is provided with a sliding tail. The rocket may comprise a casing, one or more bands slidable on the casing, tail elements secured to said bands and a stop on the casing to limit the rearward movement of said bands along said casing. Means may be provided for locking the tail in position when said bands have engaged said stop.

The invention will be further described with reference to the accompanying drawing in which Figure 1 is a view, partly in section, of the rear end of a rocket with the sliding tail in flight position, Figure 2 is a similar view showing the tail in closed position and Figure 3 is a section on the line A—A, Figure 1.

The rocket casing 1 is provided at its rear end with a stop 2, formed by a flange of greater diameter than the casing 1. Bands 4 and 5, secured together by rods 3, are capable of sliding along the casing 1, such sliding movement being limited, in the rearward direction, by the engagement of the band 5 against the stop 2. Four bars 6 are secured, for example by welding, at one end to the outside of the band 5 and at the other end to the inside of a band 7. The band 7 has an internal diameter greater than the external diameter of the stop 2. The members 3, 4, 5, 6 and 7 constitute a sliding tail. Before the rocket is fired, the sliding tail occupies a position surrounding the casing 1, as shown in Figure 2. Since no part of the tail projects beyond the end of the rocket, the overall length is much less than in the known type having a fixed tail.

When the rocket is fired, the casing 1 moves forward, leaving the sliding tail stationary, until the stop 2 strikes against the band 5, after which the tail moves with the rocket and stabilises its flight.

To prevent any tendency for the tail to bounce forward again after the stop 2 has struck the band 5, locking means may be provided comprising a resilient strip 8, for example of spring steel, secured at 9 to one of the bars 6. Similar strips may also be provided on one or more of the other bars 6. When the sliding tail is in the position shown in Figure 2, the strip 8 presses lightly against the casing 1. As the rocket moves forward into the position shown in Figure 1, the strip 8 rides over the stop 2 and drops behind it, thereby preventing any forward movement of the sliding tail relative to the casing 1. A similar result is obtainable by securing the resilient strip to the casing 1 adjacent its rear end, the said strip allowing the band 5 to pass thereover and then springing up to engage behind it.

What we claim is:

A rocket comprising a casing, two bands slidable on said casing, two rods secured to said bands and holding them in spaced relation, a stop formed by a flange at the rear end of said casing to limit rearward sliding movement of said bands, bars secured to and extending rearwardly of said bands, a larger band, of greater diameter than said stop, secured to the rear ends of said bars, and a locking strip secured to one of said bars and adapted to ride over and drop behind said stop.

CONRAD DAVID SCHERMULY.
ALFRED JAMES SCHERMULY.
CHARLES SCHERMULY.